(12) United States Patent
Uda

(10) Patent No.: US 7,784,369 B2
(45) Date of Patent: Aug. 31, 2010

(54) INSPECTION DEVICE FOR HEADREST RETURN PREVENTION MECHANISM

(75) Inventor: Minoru Uda, Mie (JP)

(73) Assignee: TS Tech Co., Ltd. (JP)

( * ) Notice: Subject to any disclaimer, the term of this patent is extended or adjusted under 35 U.S.C. 154(b) by 346 days.

(21) Appl. No.: 12/067,430

(22) PCT Filed: Sep. 21, 2006

(86) PCT No.: PCT/JP2006/318781

§ 371 (c)(1),
(2), (4) Date: Mar. 19, 2008

(87) PCT Pub. No.: WO2007/034895

PCT Pub. Date: Mar. 29, 2007

(65) Prior Publication Data

US 2009/0151481 A1    Jun. 18, 2009

(30) Foreign Application Priority Data

Sep. 21, 2005    (JP) ............................. 2005-274805

(51) Int. Cl.
*G01M 19/00* (2006.01)
(52) U.S. Cl. .................................... 73/865.8
(58) Field of Classification Search ............... 73/865.8; 297/212.12, 212.18
See application file for complete search history.

(56) References Cited

U.S. PATENT DOCUMENTS 5,373,749 A    12/1994    Strand et al. ............... 73/865.3
6,802,562 B1    10/2004    Hake et al. ............. 297/216.12

FOREIGN PATENT DOCUMENTS

| CN | 2666456 | | 12/2004 |
| JP | H03-020794 Y2 | | 5/1991 |
| JP | H06-066681 A | | 3/1994 |
| JP | H07-023724 Y2 | | 5/1995 |
| JP | H10-138812 A | | 5/1998 |
| JP | H10-138813 A | | 5/1998 |
| JP | 2005-119610 A | | 5/2005 |
| KR | 2002058869 A | * | 7/2002 |
| WO | WO 03027628 A1 | * | 4/2003 |

* cited by examiner

*Primary Examiner*—Hezron Williams
*Assistant Examiner*—Tamiko D Bellamy
(74) *Attorney, Agent, or Firm*—Schiff Hardin LLP

(57) ABSTRACT

An inspection device 1 is provided to inspect a headrest return prevention mechanism 50 that prevents return of a headrest at a position supporting the head of a seated person by moving forward at a rear collision. The headrest return prevention mechanism 50 is provided with a bracket 52 and an engagement piece 51 which can return to a normal position again after being displaced from the normal position to a fixed position. The inspection device 1 comprises a base 11, a clamp mechanism 12 that fixes the bracket 52 to the base 11, a load applying mechanism 13 that applies a load to the engagement piece 51 so as to displace it from the normal position to the fixed position, a displacement sensor 14 that measures the fixed position when the engagement piece 51 is displaced from the normal position to the fixed position, and a computer 15 that determines whether the engagement piece 51 has been displaced to a predetermined fixed position or not based on the fixed position measured by the displacement sensor 14. Thus, a defective product that is not displaced to the predetermined fixed position can be appropriately determined.

20 Claims, 12 Drawing Sheets

INSPECTION DEVICE FOR HEADREST RETURN PREVENTION MECHANISM

TECHNICAL FIELD

The present invention relates to an inspection device for inspecting a headrest return prevention mechanism and particularly to an inspection device for inspecting a headrest return prevention mechanism that holds its position in a headrest for supporting the head of a seated person by moving forward in a rear collision.

BACKGROUND ART

It is known to provide a seat for an automobile with a headrest device for protecting the head of a seated person from an impact by a collision by moving forward and for supporting the head of the seated person when the seated person is moved backward by inertia upon receipt of a collision from rear of a vehicle (See Patent Document 1, for example, which is cited below).

This seat comprises a backrest frame provided with a side-frame portion, a headrest frame provided between the side-frame portions and having a headrest mounting portion, a headrest mounted on the headrest frame, and a rear member mounted on the headrest frame through a shaft and a link mechanism. When the body of a passenger is moved backward by an impact from the rear and acts on the rear member, the rear member is moved backward from a normal position. With this movement, the headrest moves forward so as to support the head and shoulders of the passenger.

The applicant has developed a seat for a vehicle provided with the headrest return prevention mechanism in order to ascertain the support. The headrest return prevention mechanism will be described below referring to the attached drawings.

FIG. 6 is an explanatory view illustrating a state where the headrest return prevention mechanism is mounted on an upper frame of a backrest frame, FIG. 7 is an explanatory view illustrating the headrest return prevention mechanism, FIGS. 8 to 11 are explanatory views showing the headrest return prevention mechanism from the side face, in which FIG. 8 is an explanatory view illustrating a normal position of a movable portion in the headrest return prevention mechanism, FIG. 9 is an explanatory view illustrating a state where the movable portions of the headrest return prevention mechanism is displaced rearward, FIG. 10 is an explanatory view illustrating a state where the movable portion of the headrest return prevention mechanism exceeds a dead point M, FIG. 11 is an explanatory view illustrating a state where return of a headrest mounting rod is prevented by the headrest return prevention mechanism.

FIG. 6 is an explanatory view illustrating an essential part of the backrest frame in an enlarged manner. As shown in this figure, this headrest return prevention mechanism 50 is mounted on the center part of an upper lateral frame of a backrest frame 60. A headrest mounting rod 61 to which a headrest, not shown, is fixed is disposed along an upper lateral frame of the backrest frame 60 so that it can move in an upper front direction by a link mechanism provided at both side portions of the backrest frame 60 at a rear collision.

The headrest return prevention mechanism 50 is, as shown in FIG. 7, provided with an engagement piece 51 as a movable portion having an abutting face 51a and a bent engagement face 51b, a bracket 52 mounted as a fixed portion on the backrest frame 60, a mounting shaft 53 pivotally inserting both the engagement piece 51 and the bracket 52 integrally, a push nut 56 fixing the mounting shaft 53, a return spring 54 wound around the mounting shaft 53, and an elastic contact spring 55 wound around the mounting shaft 53 in the direction opposite to the return spring 54.

At normal times, as shown in FIG. 8, the abutting face 51a of the engagement piece 51 abuts the front face of the headrest mounting rod 61 by being urged by the elastic contact spring 55. The position of this engagement piece 51 is called as a normal position.

On the other hand, at a rear collision, the headrest mounting rod 61 is moved forward and the headrest (not shown) mounted on the headrest mounting rod 61 is moved forward as shown in FIG. 9. At this time, as shown in FIG. 10, by inertia of the rear collision, the engagement piece 51 is rotated rearward around the mounting shaft 53 by its own weight of the engagement piece 51 and moved rearward from a dead point M shown in FIG. 9. After that, the head of the passenger is moved rearward by inertia, by which the headrest is pressed rearward and the headrest mounting rod 61 is moved rearward, but since the engagement piece 51 is located in the rear of the dead point M shown in FIG. 9, the lower face of the headrest mounting rod 61 is engaged with a bent engagement face 51b of the engagement piece 51 as shown in FIG. 11, and the headrest mounting rod 61 is prevented from moving further rearward. As a result, in a state where the headrest supports the head of the passenger, the return is prevented. This position of the engagement piece 51 is called a fixed position.

Once the lower face of the headrest mounting rod 61 is engaged with the bent engagement face 51b as above, the engagement piece 51 of the headrest return prevention mechanism 50 is fixed at the fixed position and the headrest mounting rod 61 abuts the engagement piece 51 and made immovable, and thus, the headrest does not return to the original position. Therefore, the headrest having been moved forward once by rearward movement of the head of the passenger does not return to the original position again but support of the head by the headrest can be made more secure.

The headrest return prevention mechanism 50 is urged by the return spring 54 provided at the mounting shaft 53 so that the engagement piece 51 returns to the normal position. Therefore, if the headrest mounting rod 61 is moved forward by some reason other than the rear collision, the inertia is sufficiently weaker than that at the rear collision, and the engagement piece 51 does not move to the rear of the dead point M in FIG. 9. Thus, the engagement piece 51 is moved forward by urging of the return spring 54 and automatically returned to the normal position shown in FIG. 8. Therefore, nonconformity that the headrest return prevention mechanism is operated by some cause other than the rear collision and return of the headrest is disturbed can be prevented.

Moreover, even if the headrest return prevention mechanism 50 is operated at the rear collision and the return of the headrest is prevented, when a passenger slightly pulls the headrest forward by a hand or the like and then, pushes the headrest rearward so as to move the headrest mounting rod 61 to the rear again, the position of the headrest can be returned to the normal position shown in FIG. 8 by urging of the return spring 54. Thus, the headrest return prevention state where return is prevented once can be canceled by the passenger himself.

Patent Document 1: Japanese Patent Application Laid-Open Publication No. 1998(H10)-138812

DISCLOSURE OF INVENTION

Problem to be Solved by the Invention

However, there might be a possibility of inconvenience that the return prevention mechanism cannot be operated and the engagement piece 51 cannot be displaced to a predetermined fixed position due to a defect in parts constituting the headrest return prevention mechanism 50 or wrong setting of parts of the headrest return prevention mechanism 50 in an assembling process.

The present invention was made in view of the above circumstances and has an object to provide an inspection device for headrest return prevention mechanism for inspecting the headrest return prevention mechanism mounted on a vehicle seat provided with a headrest for moving forward at a rear collision so as to support the head of a seated person and to prevent return of the headrest.

MEANS FOR SOLVING PROBLEM

The above problem is solved by an inspection device 1 for a headrest return prevention mechanism, as described in claim 1, for inspecting the headrest return prevention mechanism 50 provided with a fixed portion (bracket 52) mounted on a backrest frame and a movable portion (engagement piece 51) which can return from the normal position where the headrest cannot be fixed to a normal position again after being displaced to a fixed position where the headrest can be fixed while the head of a seated person is supported, comprising a base 11, fixing means (clamp mechanism 12) for fixing the fixed portion (bracket 52) to the base 11, displacing means (load applying mechanism 13) for applying a load to the movable portion (engagement piece 51) so as to displace the movable portion (engagement piece 51) from the normal position to the fixed position, position measuring means (displacement sensor 14) for measuring the fixed position when the movable portion (engagement piece 51) is displaced from the normal position to the fixed position, and determining means (computer 15) for determining if the movable portion (engagement piece 51) has been displaced to a predetermined fixed position or not on the basis of the fixed position measured by the position measuring means (displacement sensor 14).

According to the inspection device 1 for a headrest return prevention mechanism as described in claim 1 as above, the position measuring means (displacement sensor 14) is provided for measuring the fixed position when a load is applied to the movable portion (engagement piece 51) of the headrest return prevention mechanism 50 using the displacing means (load applying mechanism 13) to displace it from the normal position to the fixed position, and it can be determined if the movable portion (engagement piece 51) has been displaced to the predetermined fixed position or not on the basis of the measured fixed position. Thus, a defective product in which the movable portion (engagement piece 51) is not displaced to the predetermined fixed position can be appropriately determined.

According to the inspection device 1 for a headrest return prevention mechanism as described in claim 2, the position measuring means (displacement sensor 14) is preferably a displacement sensor that can measure a distance to the movable portion (engagement piece 51) at the fixed position, and the determining means (computer 15) preferably determines if the movable portion (engagement piece 51) has been displaced to the predetermined fixed position or not based on whether a distance between the position measuring means (displacement sensor 14) and the movable portion (engagement piece 51) is included in a predetermined range or not.

According to the inspection device 1 for a headrest return prevention mechanism as described in claim 2 as above, the distance to the movable portion (engagement piece 51) at the fixed position is measured by the displacement sensor 14, and it is determined if the movable portion (engagement piece 51) has been displaced to the predetermined fixed position or not based on whether the distance is included in the predetermined range nor not, therefore, a defective product in which the movable portion (engagement piece 51) is not displaced to the predetermined fixed position can be appropriately determined. Also, since the predetermined range is provided as an allowable error, a slight error at the fixed position, if any, is allowed and can be determined as a non-defective product, which enables appropriate determination of only defective products.

According to the inspection device 1 for a headrest return prevention mechanism as described in claim 3, the position measuring means (displacement sensor 14) preferably measures the normal position after the movable portion (engagement piece 51) is displaced to the fixed position by the displacing means (load applying mechanism 13) and then, the load is released so that the movable portion (engagement piece 51) is returned, and the determining means (computer 15) further preferably determines if the movable portion (engagement piece 51) has been returned to the predetermined normal position or not based on the normal position after the return measured by the position measuring means (displacement sensor 14).

According to the inspection device 1 for a headrest return prevention mechanism as described in claim 3 as above, after the movable portion (engagement piece 51) has been displaced from the normal position to the fixed position and then, the movable portion (engagement piece 51) is returned from the fixed position to the normal position by releasing the load, and by measuring the normal position after the return, it can be determined whether the movable portion (engagement piece 51) has been returned to the predetermined normal position or not. Therefore, a defective product which is not returned to the predetermined position after the movable portion (engagement piece 51) is displaced and then returned to the normal position can be appropriately determined.

According to the inspection device 1 a for headrest return prevention mechanism as described in claim 4, the displacing means (load applying mechanism 13) is preferably provided with a pressing member 45 for pressing the movable portion (engagement piece 51) and a plurality of weights 46 which can be detachably attached to the pressing member 45 and made capable of increasing/decreasing the load to be applied to the movable portion (engagement piece 51) by increasing/decreasing the number of the weights 46 to be attached to the pressing member 45.

According to the inspection device 1 for a headrest return prevention mechanism as described in claim 4 as above, the load applied to the movable portion (engagement piece 51) can be adjusted by a simple operation to increase/decrease the number of weights 46 by mounting/removing the weights 46 on/from the pressing member 45 constituting the displacing means (load applying mechanism 13). Therefore, a desired load can be applied to the movable portion (engagement piece 51).

According to the inspection device 1 for a headrest return prevention mechanism as described in claim 5, the pressing member 45 is preferably mounted on the lower end portion of a rod-like body 44 and has a predetermined diameter at an upper part, and the weight 46 preferably has a hole with a diameter smaller than the above diameter and is mounted on the pressing member 45 in a state where the rod-like body 44 is inserted through the hole.

According to the inspection device 1 for a headrest return prevention mechanism as described in claim 5 as above, the rod-like body 44 can be inserted through the hole in the weight 46 and mounted on the pressing member 45, and a stable load can be applied by the pressing member 45 to the movable portion (engagement piece 51) without removal of the weight 46 from the rod-like body 44 and the pressing member 45.

Also, since the weight 46 is not in contact with members other than the pressing member 45 and the rod-like body 44 and is mounted on the pressing member 45, a load applied by the weight of the weight 46 is not distributed by the other members, and the weight of the total weights of all the weights 46 are applied on the pressing member 45 as it is. Thus, by pushing down the movable portion (engagement piece 51) by the pressing member 45, a load corresponding to the total weight of the pressing member 45, the rod-like body 44, and the weight 46 can be applied to the movable portion (engagement piece 51), and a constant load can be applied to the movable portion (engagement piece 51).

According to the inspection device 1 for a headrest return prevention mechanism as described in claim 6, the rod-like body 44 is preferably mounted on a mounting portion 43 having a hole and the upper end portion of the rod-like body 44 is preferably formed with a loop portion that is wider than the hole of the mounting portion 43.

According to the inspection device 1 for a headrest return prevention mechanism as described in claim 6 as above, since the loop portion at the upper end portion of the rod-like body 44 is wider than the hole of the mounting portion 43, the loop portion of the rod-like body 44 is caught by the mounting portion 43 and will not drop from the mounting portion 43, and the rod-like body 44 is vertically slidable with respect to the mounting portion 43. Thus, a stable load can be applied to the movable portion (engagement piece 51).

According to the inspection device 1 for a headrest return prevention mechanism as described in claim 7, a part detection sensor (color sensor 16) is further preferably provided for detecting if a predetermined part constituting the headrest return prevention mechanism 50 is at a predetermined position or not.

According to the inspection device 1 for a headrest return prevention mechanism as described in claim 7 as above, since it is possible to detect if a part constituting the headrest return prevention mechanism 50 is at a predetermined position or not, a missing part, displacement or the like of the part constituting the headrest return prevention mechanism 50 can be detected. Thus, it is made possible to determine if the headrest return prevention mechanism 50 is defective or not more surely.

According to the inspection device 1 for a headrest return prevention mechanism as described in claim 8, the part detection sensor (color sensor 16) is preferably a color sensor for identifying the color of the part.

According to the inspection device 1 for a headrest return prevention mechanism as described in claim 8, since a color sensor 16 for identifying the color of a part is used to determine if the part is located at a predetermined position or not, parts can be detected remotely in a non-contact manner. Thus, as compared with a case where the part detection sensor (color sensor 16) and the part are brought into contact with each other for position detection when the position of the part is searched, quick detection is made possible, and there is no worry that displacement or the like is caused in a part by contact between the part detection sensor and the part.

According to the inspection device 1 for a headrest return prevention mechanism as described in claim 9, a mounting hole 52*a* is formed in the fixed portion (bracket 52), and a projection 25 is preferably formed in the base 11 at a position corresponding to the mounting hole 52*a* when the fixed portion (bracket 52) is mounted.

According to the inspection device 1 for a headrest return prevention mechanism as described in claim 9 as above, since the mounting hole 52*a* is formed in the fixed portion (bracket 52) and the projection 25 is provided on the base 11 at the position corresponding to the mounting hole 52*a*, the projection 25 can be used as a positioning member when the fixed portion (bracket 52) is fixed to the base 11. Thus, the fixed portion (bracket 52) can be fixed to an accurate position on the base 11 and inconvenience of displacement or the like after fixation can be also prevented.

According to the inspection device 1 for a headrest return prevention mechanism as described in claim 10, the fixing means (clamp mechanism 12) is preferably provided with a holding portion 34 formed at a position corresponding to the projection 25 so that a part of the fixed portion (bracket 52) is held between the holding portion 34 and the base 11 to fix the fixed portion (bracket 52) to the base 11.

According to the inspection device 1 for a headrest return prevention mechanism as described in claim 10 as above, since the fixed portion (bracket 52) is fixed to the base 11 by holding a part of the fixed portion (bracket 52) between the holding portion 34 and the base 11, displacement of the fixed portion (bracket 52) is difficult to occur after fixation, and inspection can be carried out in a stable state.

EFFECT OF THE INVENTION

According to the inspection device for a headrest return prevention mechanism of the present invention, a load is applied to the movable portion of the headrest return prevention mechanism using the displacing means to displace it from the normal position to the fixed position so that it can be determined if the fixed position is at a predetermined fixed position or not. Thus, it is made possible to appropriately determine a defective product whose movable portion is not displaced to the predetermined fixed portion.

Figure 1:
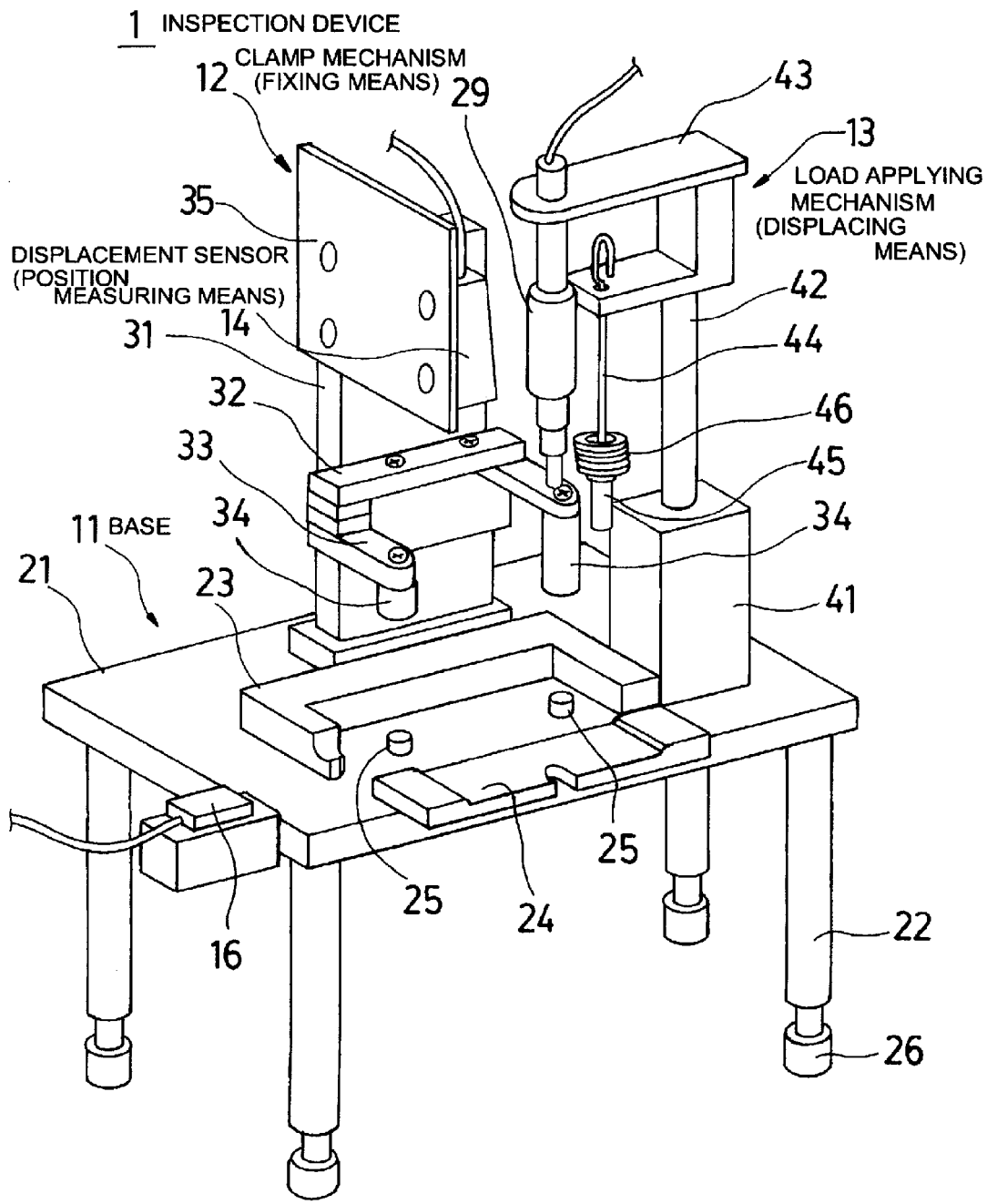
FIG. 1 is a perspective view illustrating the entirety of an inspection device of the present invention looked down on from a diagonally upper front.

EXPLANATIONS OF LETTERS OR NUMERALS 1 inspection device
11 base
12 clamp mechanism (fixing means)
13 load applying mechanism (displacing means)
14 displacement sensor (position measuring means)
15 computer (determining means)
16 color sensor (part detection sensor)
21 table
22 leg portion
23 frame plate
24 abutting plate
25 projection
26 adjuster
29 printing means
31 column
32 elevation portion
33 arm portion
34 holding portion
35 mounting plate
41 support
42 pole
43 mounting portion
44 rod-like body
45 pressing member
46 weight
50 headrest return prevention mechanism
51 engagement piece (movable portion)
51a abutting face
51b bent engagement face
51c weight portion
52 bracket (fixed portion)
52a mounting hole
53 mounting shaft
54 return spring
55 spring for elastic contact
56 push nut
60 backrest frame
61 headrest mounting rod
M dead point

BEST MODES FOR CARRYING OUT THE INVENTION

An embodiment of the present invention will be described below based on the attached drawings. Members, arrangement, and the like described below do not limit the present invention but they are capable of various modifications in a range of the gist of the present invention.

Figure 2:
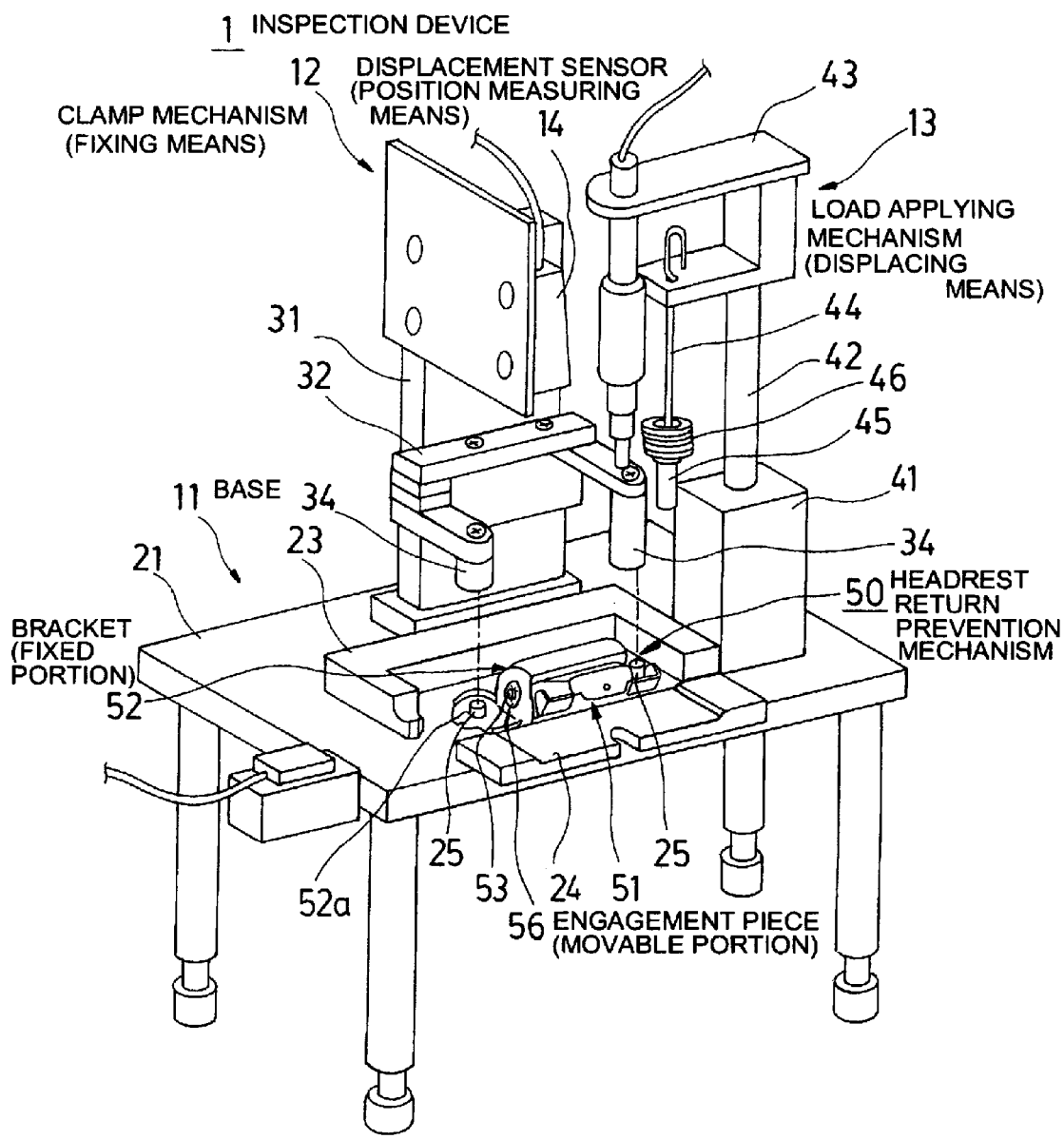
FIG. 2 is a perspective view illustrating a state where a headrest return prevention mechanism is mounted on the inspection device of the present invention.
Figure 3:
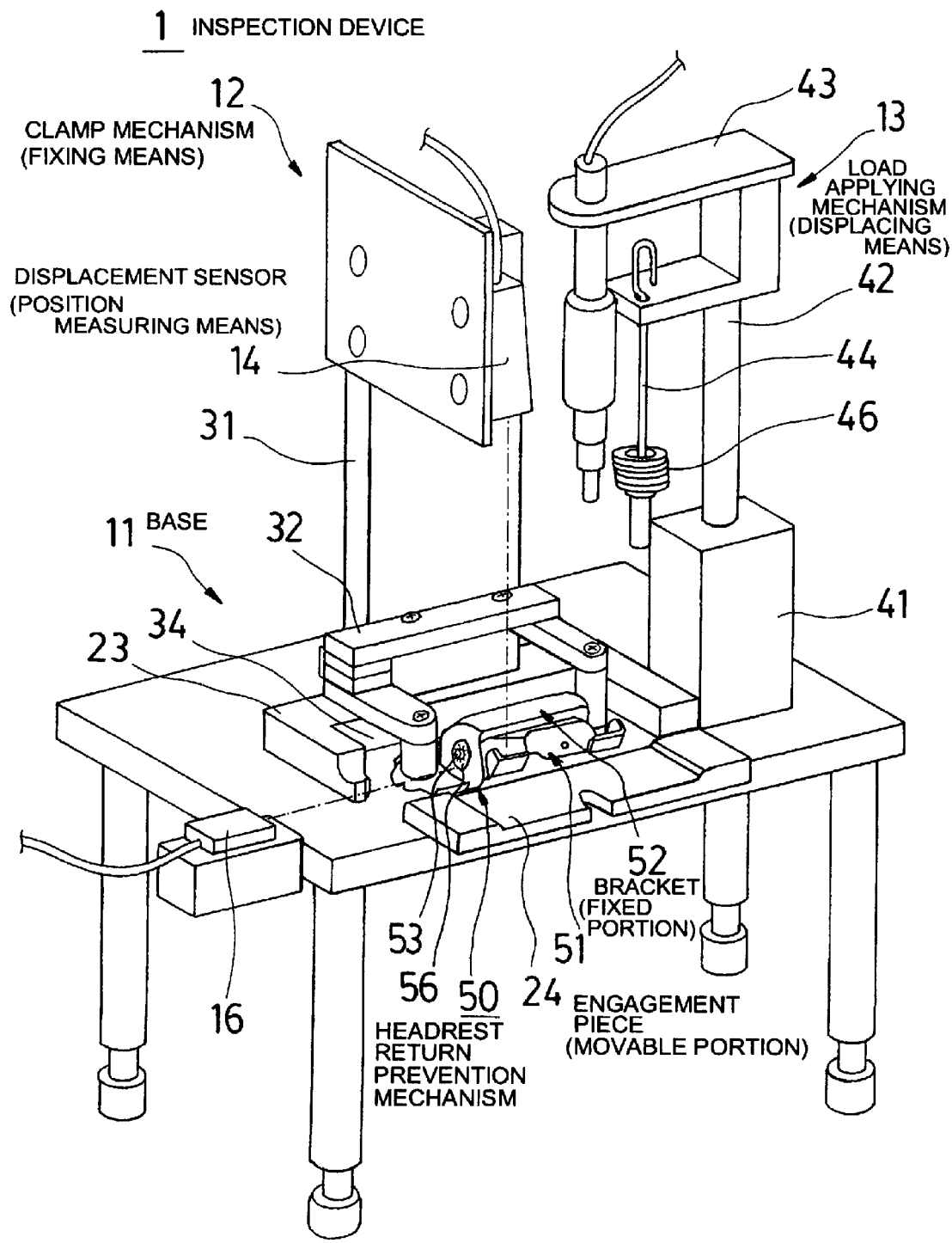
FIG. 3 is a perspective view illustrating a state where the headrest return prevention mechanism is fixed to the inspection device of the present invention.
Figure 4:
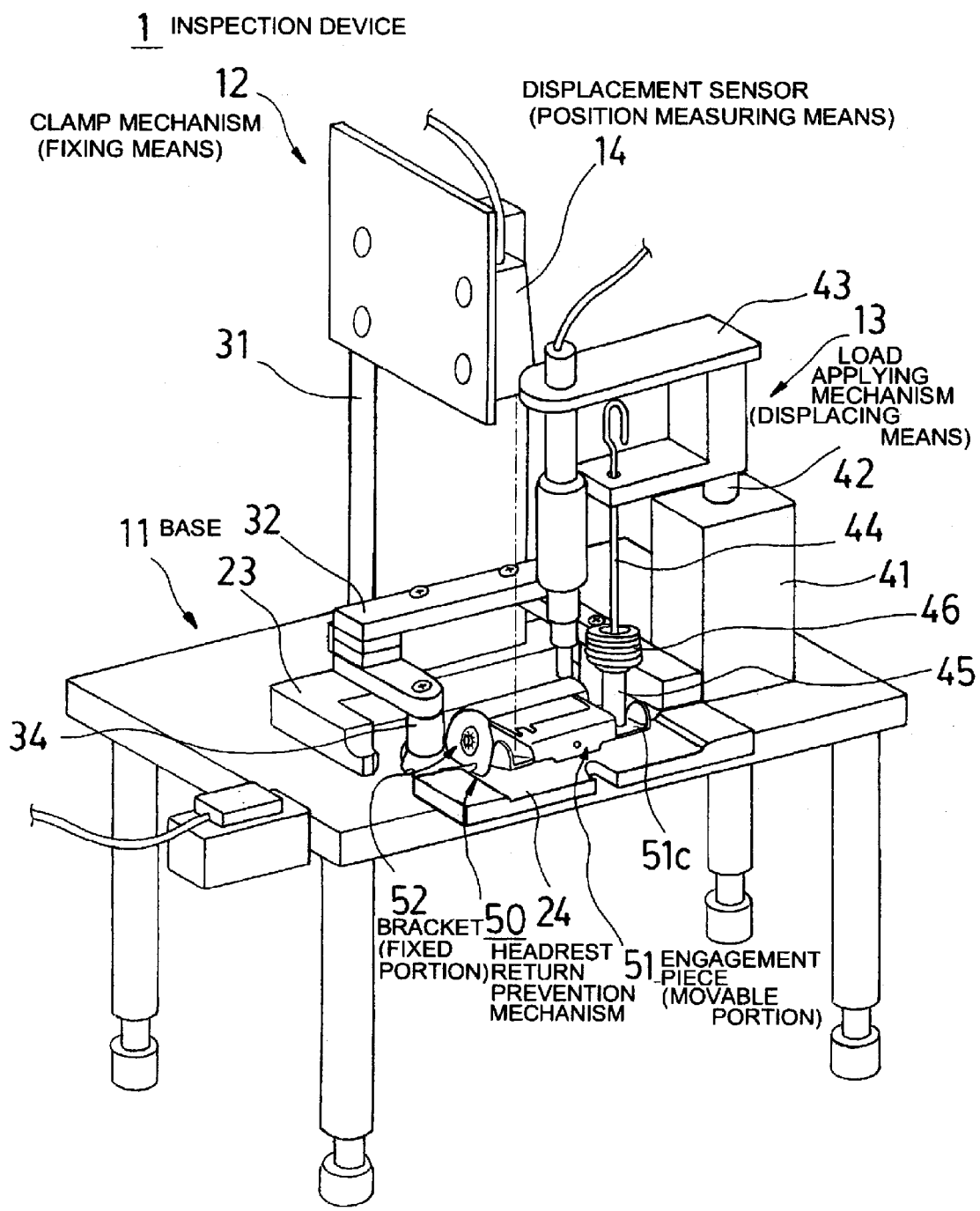
FIG. 4 is a perspective view illustrating a state where a load is applied to a movable portion of the headrest return prevention mechanism so as to displace the movable portion to a fixed position.
Figure 5A:
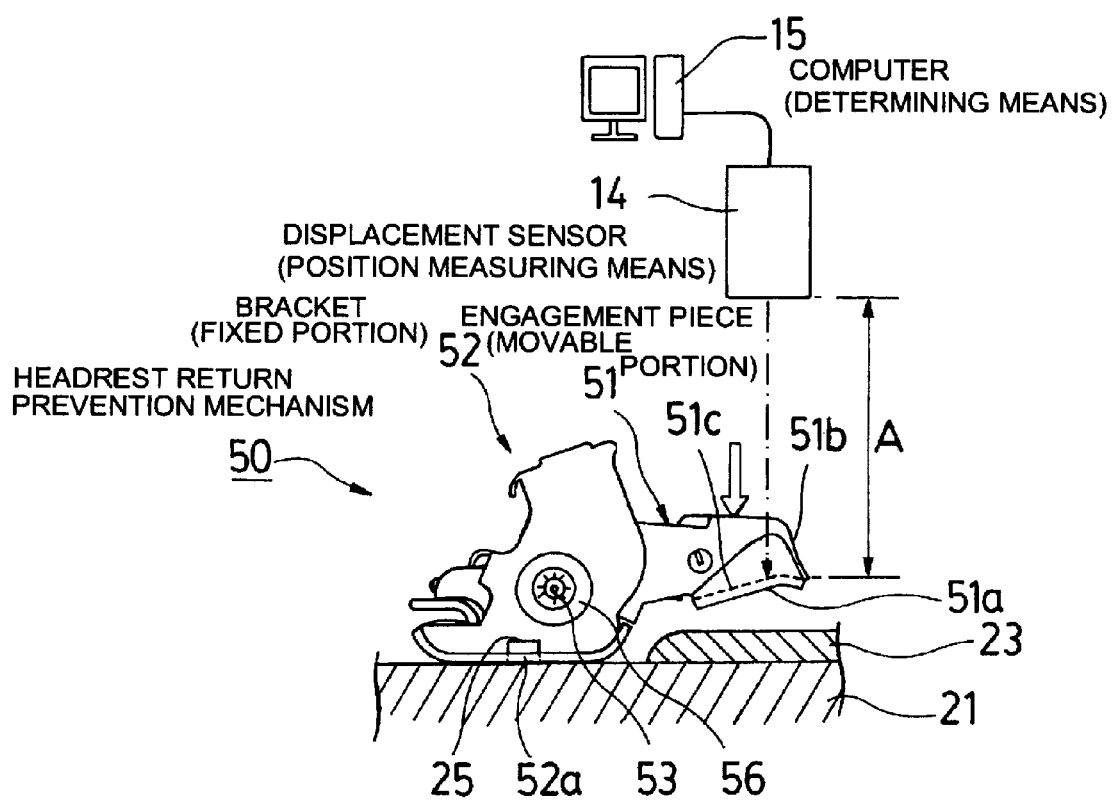
FIGS. 5A and 5B are explanatory views illustrating a measurement state of a fixed position and a normal position after return of the movable portion of the headrest return prevention mechanism.
Figure 5B:
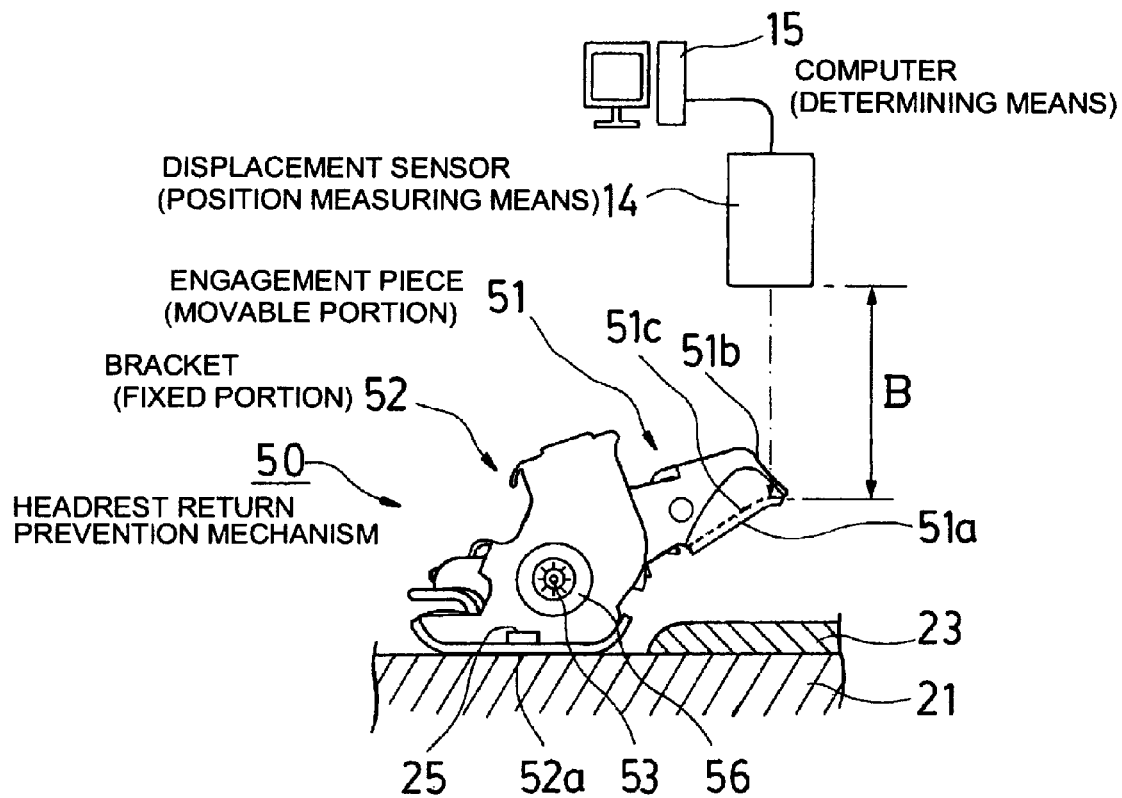
Figure 6:
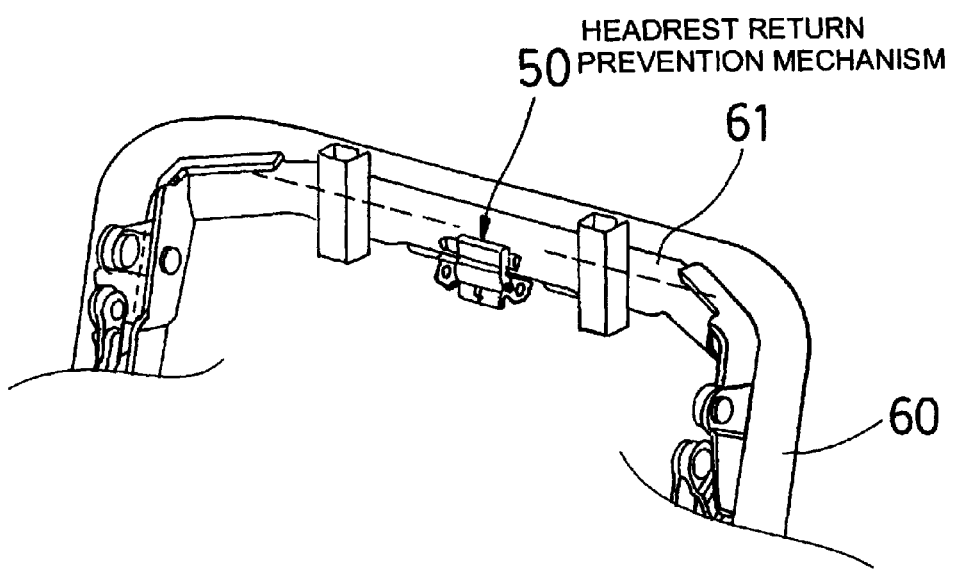
FIG. 6 is an explanatory view illustrating a state where the headrest return prevention mechanism is mounted on an upper frame of a backrest frame.
Figure 7:
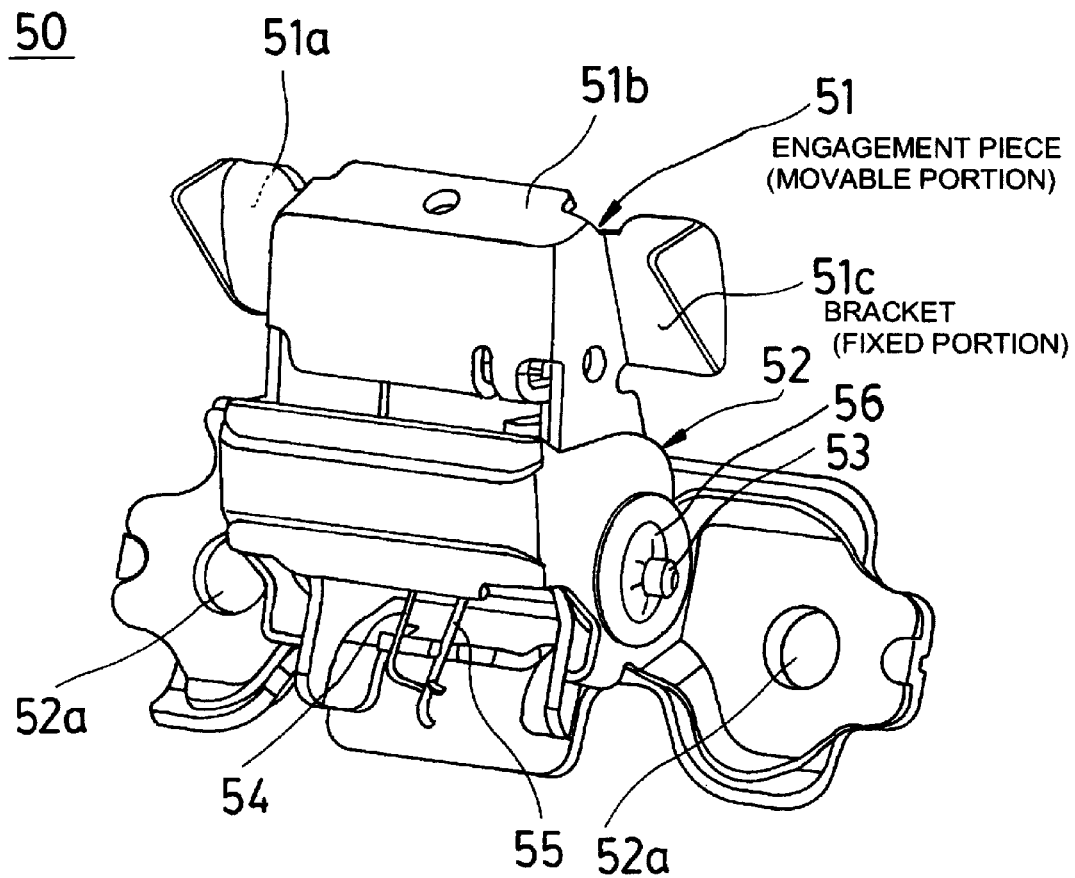
FIG. 7 is an explanatory view illustrating the headrest return prevention mechanism.
Figure 8:
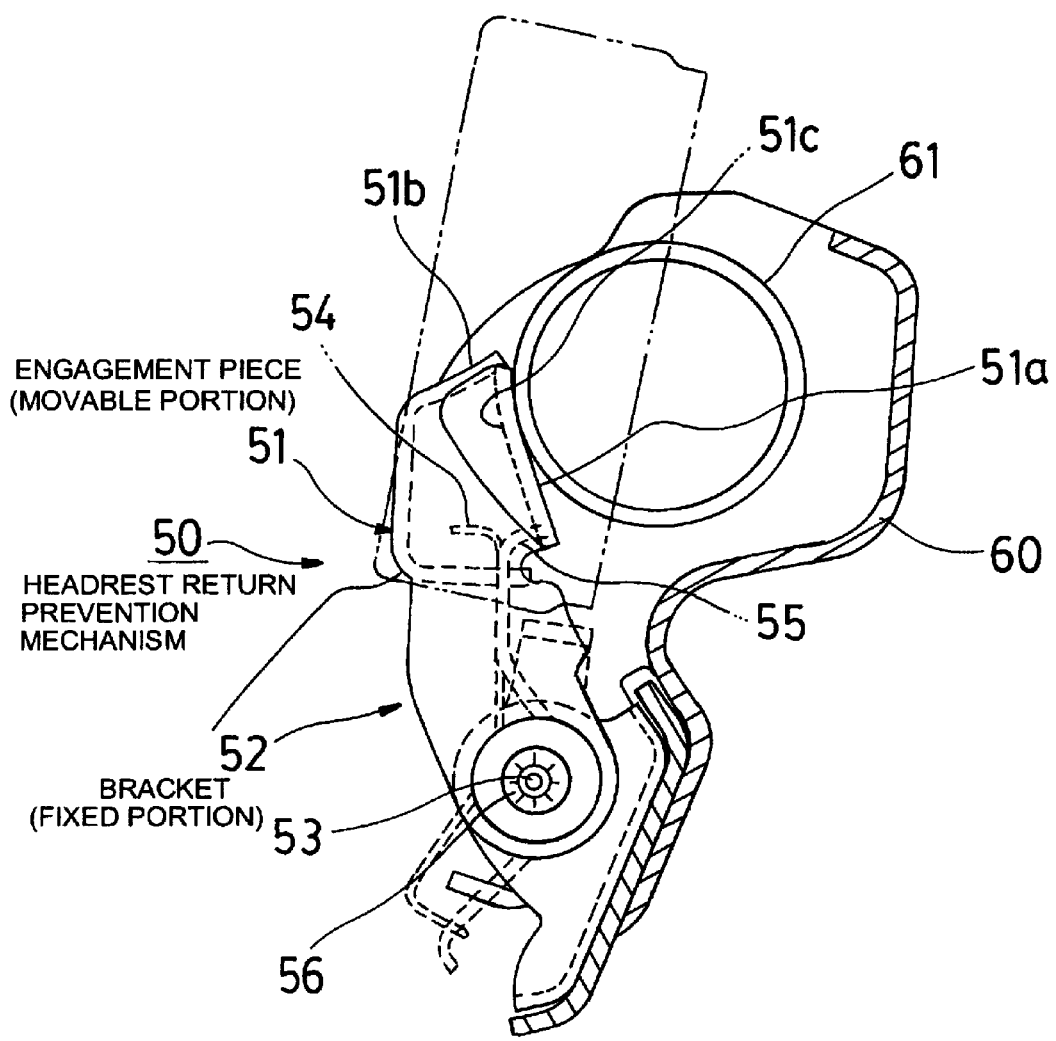
FIG. 8 is an explanatory view illustrating the normal position of the movable portion of the headrest return prevention mechanism.
Figure 9:
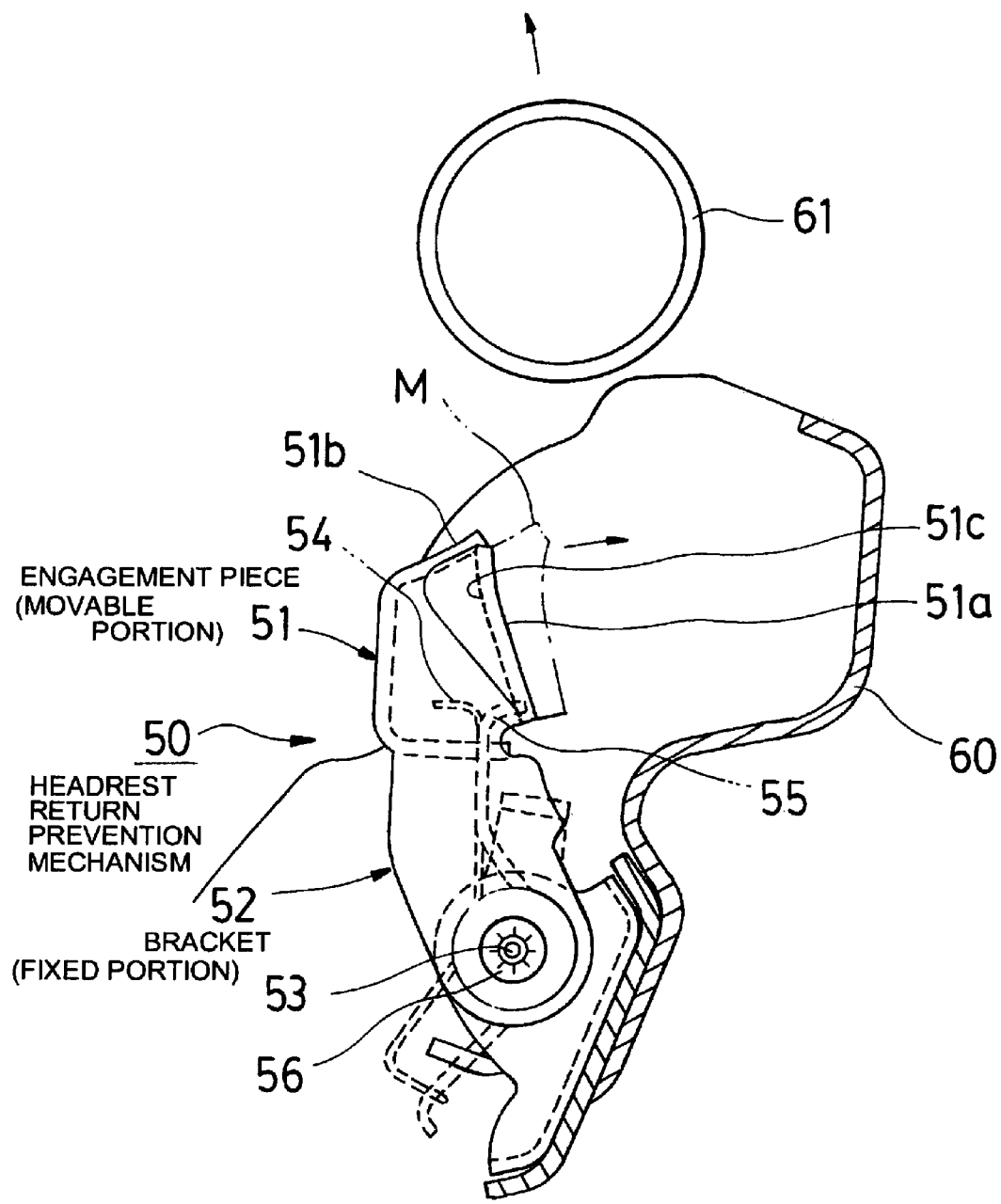
FIG. 9 is an explanatory view illustrating a state where the movable portion of the headrest return prevention mechanism is displaced to the rear.
Figure 10:
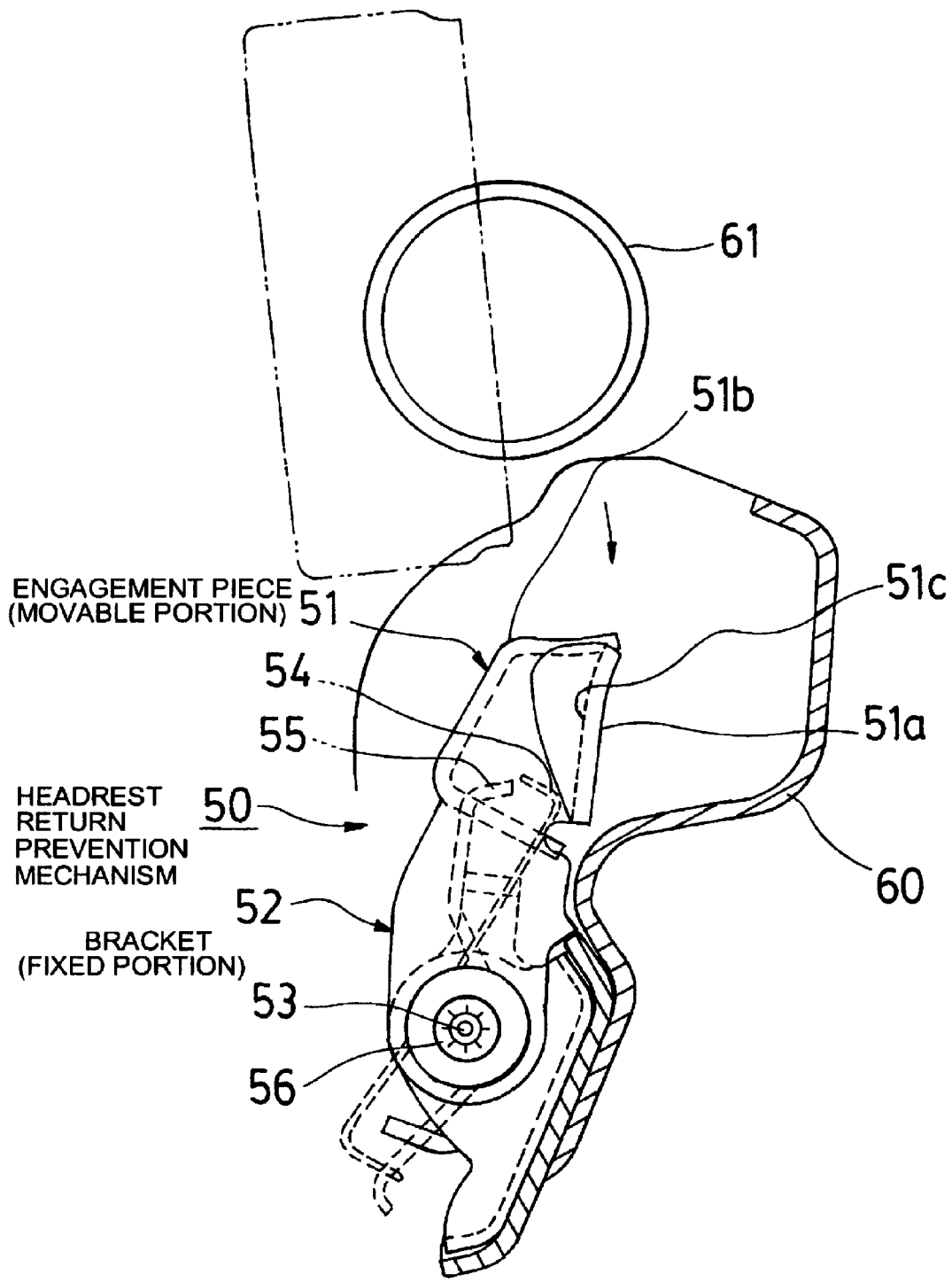
FIG. 10 is an explanatory view illustrating a state where the movable portion of the headrest return prevention mechanism has exceeded a dead point M.
Figure 11:
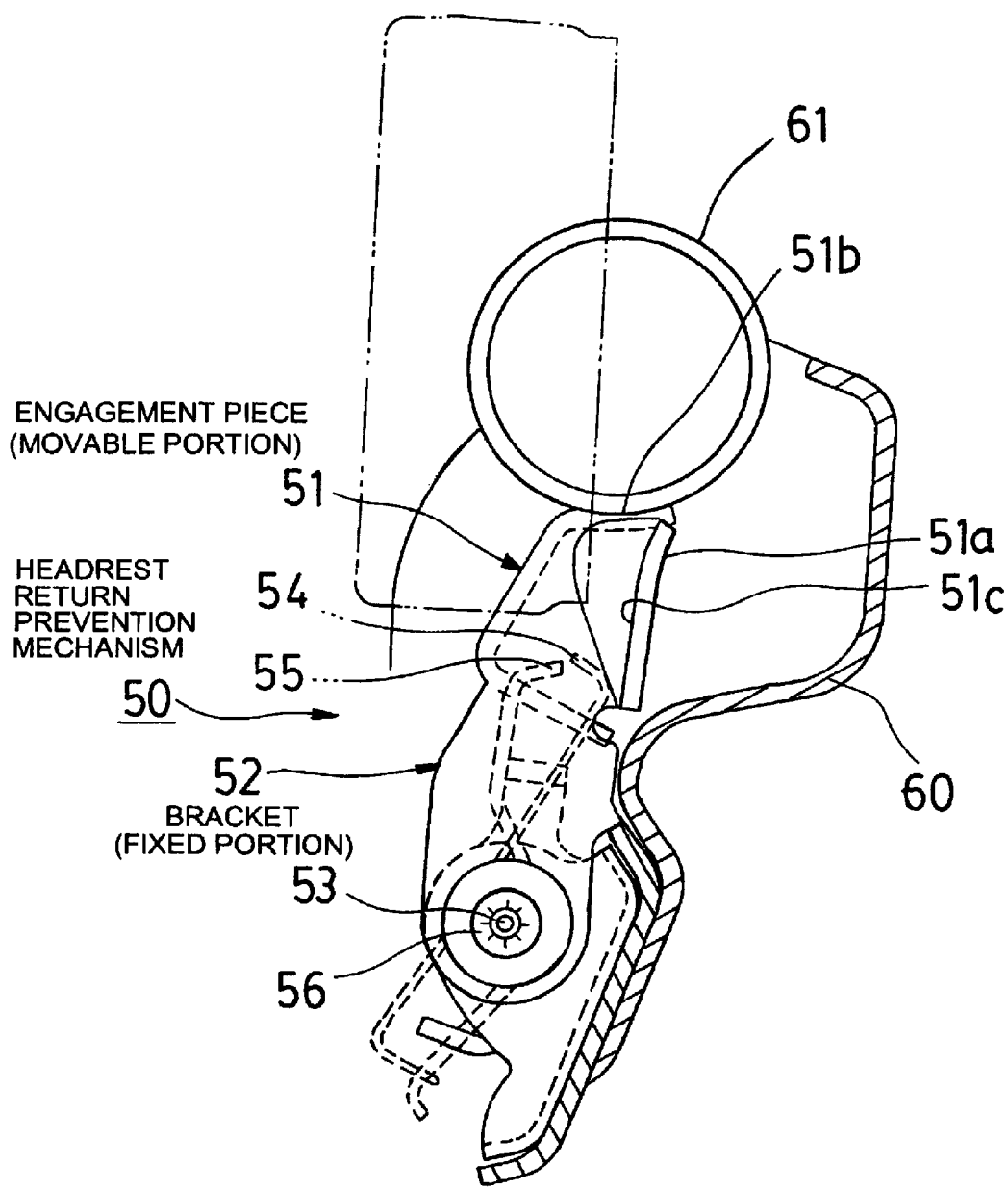
FIG. 11 is an explanatory view illustrating a state where return of a headrest mounting rod is prevented by the headrest return prevention mechanism.

FIGS. 1 to 5 show an inspection device of a headrest return prevention mechanism of the present invention, in which FIG. 1 is a perspective view illustrating an entirety of the inspection device of the present invention looked down on from diagonally upper front, FIG. 2 is perspective view illustrating a state where the headrest return prevention mechanism is mounted on the inspection device of the present invention, FIG. 3 is a perspective view illustrating a state where the headrest return prevention mechanism is fixed to the inspection device of the present invention, FIG. 4 is a perspective view illustrating a state where a load is applied to a movable portion of the headrest return prevention mechanism so as to displace the movable portion to a fixed position, and FIGS. 5A and 5B are an explanatory view illustrating a measurement state of a fixed position and a normal position after return of the movable portion of the headrest return prevention mechanism. Particularly, FIG. 5A is an explanatory view illustrating a measurement state of the fixed position of the movable portion of the headrest return prevention mechanism, and FIG. 5B is an explanatory view illustrating a measurement state of the normal position after return of the movable portion of the headrest return prevention mechanism.

As shown in FIG. 1, the inspection device 1 of this embodiment comprises a base 11, a clamp mechanism 12 provided on the base 11, a load applying mechanism 13 provided on the base 11, and a displacement sensor 14 provided similarly on this base 11 as major constituent elements. Though not shown in this figure, the displacement sensor 14 is electrically connected to a computer 15 as shown in FIGS. 5A and 5B.

The clamp mechanism 12 corresponds to the fixing means of the present invention, the load applying mechanism 13 corresponds to the displacing means of the present invention, the displacement sensor 14 corresponds to position measuring means of the present invention, and the computer 15 corresponds to determining means of the present invention.

An engagement piece 51 of the headrest return prevention mechanism 50 corresponds to the movable portion of the present invention, and the bracket 52 corresponds to the fixed portion of the present invention.

The base 11 has a table 21 provided horizontally with respect to the ground, a leg portion 22 provided on a lower face of the table 21 and supporting the table 21, a frame plate 23 fixed on an upper face of the table 21, and an abutting plate 24 fixed similarly to the upper face of the table 21 as main constituting elements.

The leg portion 22 is provided in the vicinity of the four corners of the lower face of the table 21 and supports the table 21. At the lower end of the leg portion 22, an adjuster 26 which can adjust the length of the leg portion 22 is provided, and by adjusting the length of each leg portion 22, the horizontal position of the table 21 can be adjusted.

On the upper face of the table 21, the frame plate 23 and the abutting plate 24 are provided. As shown in FIG. 2, the frame plate 23 is in a U-shape surrounding the periphery of the bracket 52 of the headrest return prevention mechanism 50 and may be formed by a synthetic resin such as plastic. The abutting plate 24 is a rectangular member, may similarly be formed by a synthetic resin, and surrounds the periphery of the bracket 52 together with the frame plate 23.

Returning to FIG. 1, on the upper face of the table 21 surrounded by the frame plate 23 and the abutting plate 24, two projections 25 are provided. The projections 25 are provided at positions corresponding to the two mounting holes 52a provided in the bracket 52 of the headrest return prevention mechanism 50 as will be described later and used for positioning when the bracket 52 is fixed to the base 11.

The color sensor 16 is installed on the side face of the table 21. This color sensor 16 uses a tricolor LED light source as a light-emitting element and is a sensor that identifies color of an article by irradiating light from the light-emitting element to the article and detecting reflected light from the article. In this embodiment, presence or nonconformity in assembling of the push nut 56 in the headrest return prevention mechanism 50 shown in FIG. 2 is determined using the color sensor 16. The color sensor 16 corresponds to a part detection sensor of the present invention.

The push nut 56 in this embodiment has a through hole formed at the center in the disk state and a plurality of slits formed radially on its periphery and is a member to prevent removal or displacement of the mounting shaft 53 from the bracket 52. This push nut 56 is black in color, and the color sensor 16 detects black of the push nut 56 when the push nut 56 is present, but if the push nut 56 is missing or displaced from a predetermined position, the black color is not detected. By this arrangement, a defective product of the headrest return prevention mechanism 50 can be determined.

In the vicinity of the outer side face of the longitudinal portion of the frame plate 23, the clamp mechanism 12 is installed. The clamp mechanism 12 has a column 31 installed upright in the perpendicular direction to the table 21, an elevation portion 32 vertically moved along the column 31, a pair of arm portions 33 disposed horizontally with respect to the table 21 from this elevation portion 32, and columnar holding portions 34 mounted downward at the tip end portions of the arm portions 33, respectively.

The column 31 is installed upright on the table 21 in the vicinity of the outer side face in the longitudinal portion of the frame plate 23 and is a column formed by a material such as metal and having a rectangular cross-sectional shape. On the side of the column 31 facing the frame plate 23, the elevation portion 32 is mounted. The elevation portion 32 can be vertically moved along the column 31 by a driving mechanism such as a motor, not shown.

The driving mechanism for the elevation portion 32 is not limited to those using such a motor, but vertical movement may be made by hydraulic pressure, for example. Also, the vertical movement may be made manually.

On the elevation portion 32, the pair of arm portions 33 projecting laterally is mounted. On the tip end portions of the arm portions 33, the holding portions 34 projecting downward are mounted, respectively. A screw hole is formed on the upper end face of the holding portion 34, and the lower end face has a columnar hollow shape. On the other hand, a screw hole is also formed downward at the tip end portion of the arm portion 33. And the arm portion 33 and the holding portion 34 are pinned together by a screw.

The lower end of the holding portion 34 is cylindrical. The holding portions 34 are arranged at positions corresponding to the two projections 25 provided on the table 21, respectively. Thus, by downward movement of the elevation portion 32, the projection 25 is accommodated in the cylinder of the holding portion 34. By making the upper end face of the projection 25 round, even if the position of the holding portion 34 is slightly displaced, the lower end face of the holding portion 34 is difficult to be caught by the projection 25 and the projection 25 is easily accommodated in the cylinder of the holding portion 34, which is preferable.

On the upper side face of the column 31, the mounting plate 35 is mounted in a state projecting laterally. On the side face of the mounting plate 35, the displacement sensor 14 is mounted. The displacement sensor 14 in this embodiment is a laser-type displacement sensor and has a semiconductor laser element oscillating a semiconductor laser to an article, a light receiving element receiving the laser beam reflected from the article, and a signal processing portion obtaining a position of the article through signal processing of the laser light detected by the light receiving element. A part of the laser beam irradiated to the article is reflected and enters the light receiving element. The reflected light received by the light receiving element is converted to an electric signal, the electric signal is processed by the signal processing portion, and the current position of the article is obtained.

As shown in FIGS. 3 and 4, the displacement sensor 14 in this embodiment is mounted on the side face of the mounting plate 35 while being positioned so that the laser beam is oriented to a weight portion 51c of the engagement piece 51. A part of the laser beam irradiating the weight portion 51c is reflected and enters the light receiving element. The reflected light received by the light receiving element is converted to an electric signal. The electric signal is processed at the signal processing portion and the position of the weight portion 51c can be obtained.

A type of the displacement sensor 14 is not limited to the laser type as in this embodiment, but known displacement sensors such as LED type, contact type, ultrasonic type, eddy current type, and two-dimensional CCD type may be used.

As shown in FIGS. 5A and 5B, the displacement sensor 14 is electrically connected to the computer 15. The computer 15 is provided with a determining function to determine if an article is at a predetermined position or not from the current position of the article measured by the displacement sensor 14. The determination result can be displayed on a display of the computer 15 or notified using other means.

Returning to FIG. 1, in the vicinity of the outer side face of a shorter portion of the frame plate 23, a load applying mechanism 13 is installed. The load applying mechanism 13 comprises a rectangular solid support 41, a pole 42 capable of vertical movement with respect to the support 41, a mounting portion 43 mounted on the upper end of the pole 42, a rod-like body 44 having its upper end portion mounted on the mounting portion 43, a pressing member 45 mounted on the lower end of the rod-like body 44, and a plurality of weights 46 loaded on the upper part of the pressing member 45.

The support 41 is installed upright on the table 21 on the side of the frame plate 23. A driving mechanism, not shown, is provided inside the support 41 so that the pole 42 is vertically moved by the driving mechanism. The mounting portion 43 is mounted on the upper end of the pole 42 and is provided with upper and lower lateral plates projecting laterally. The rod-like body 44 is mounted to the lower lateral plate, while a printing means 29 is mounted to the upper lateral plate, respectively. The driving mechanism driving the support 41 includes a mechanism using hydraulic pressure or motor, for example.

The rod-like body 44 is a rod-like member formed of metal or the like and is mounted on the mounting portion 43, penetrating a hole formed at the center of the lower lateral plate of the mounting portion 43. The upper end portion of the rod-like body 44 is bent into a loop that is wider than the hole of the mounting portion 43 so that it is not removed from the mounting portion 43. Since the rod-like body 44 is not directly fixed to the mounting portion 43, it is capable of vertical sliding in and penetrating the hole of the mounting portion 43.

The pressing member 45 is mounted on the lower end portion of the rod-like body 44. The pressing member 45 has an upper part formed cylindrically with a large diameter. On the upper face of the pressing member 45, the plurality of ring-state weights 46 are loaded. A hole with a diameter smaller than the large-diameter upper part of the pressing member 45 is formed at the center part of the weights 46, and the weights 46 are loaded on the pressing member 45 in a state where the rod-like body 44 is inserted into the hole and made unable to be removed. Since the hole of the weights 46 has a diameter larger than the lateral width of the loop formed on the upper end portion of the rod-like body 44, the weight 46 can be removed from the upper end portion of the rod-like body 44.

The lower end face of the pressing member 45 is positioned so as to be abutted on the weight portion 51c of the engagement piece 51, and by driving the pole 42 downwardly by the driving mechanism provided at the support 41, the pressing member 45 is also moved toward the vertically downward direction and presses the weight portion 51c in the vertically downward direction.

In this embodiment, by increasing/decreasing the number of weights 46 mounted on the pressing member 45, the load applied to the weight portion 51c of the engagement piece 51 can be adjusted. By such a simple procedure to increase/decrease the number of weights 46, a desired weight can be applied to the weight portion 51c. The load to be applied to the weight portion 51c is usually 10 to 30 grams.

As shown in FIG. 4, when the pole 42 is lowered by the driving mechanism of the support 41, the lower end face of the pressing member 45 presses the weight portion 51c. As a result, the engagement piece 51 is displaced from the normal position to the fixed position.

When the pole 42 is raised by the driving mechanism of the support 41 from this state, the pressing member 45 is raised, and the load applied on the weight portion 51c is released. As a result, the engagement piece 51 is returned from the fixed position to the normal position.

The printing means 29 is fixed to the upper lateral plate of the mounting portion 43. On the tip end face of the printing means 29, characters such as "Passed" indicating acceptance of an inspection are engraved. By driving the driving means of the support 41 so as to move the printing means 29 downward and pressing the tip end face of the printing means 29 on the upper face of the engagement piece 51, the acceptance mark can be printed on the upper face of the engagement piece 51.

The printing means 29 is not limited to the above stamp type but affixation of a seal or inkjet printing may be employed. If the whole or a part of the engagement piece 51 is formed by plastic, print may be applied by an irradiating laser or the like so as to carbonize the surface of the plastic or the like by thermal energy.

Moreover, instead of or in addition to the acceptance mark, an identification number of the headrest return prevention mechanism 50 having conducted the inspection may be printed. Alternatively, instead of the identification number, a barcode may be printed. Then, an individual identification code is given to the headrest return prevention mechanism 50 having conducted the inspection, and traceability after inspection of the product can be guaranteed.

Next, using the inspection device 1 of the present invention, a procedure to inspect the headrest return prevention mechanism 50 will be described.

As shown in FIG. 2, the headrest return prevention mechanism 50 is loaded on the table 21 so that the two mounting holes 52a of the bracket 52 are located over the two projections 25 on the table 21.

Then, as shown in FIG. 3, the elevation portion 32 is lowered. Since the projection 25 is positioned to be accommodated in the lower-end cylinder of the holding portion 34, when the elevation portion 32 is lowered, the projection 25 is accommodated in the cylinder and the bracket 52 is fixed onto the table 21 while the peripheral portion of the mounting hole 52a of the bracket 52 is held between the surface of the table 21 and the lower end face of the holding portion 34.

After the bracket 52 is fixed onto the table 21, presence of the push nut 56 is inspected by the color sensor 16.

By this inspection, only if the push nut 56 is appropriately mounted, the procedure goes to the subsequent process. If the push nut 56 is not mounted or the push nut 56 is not mounted at an appropriate position, this product is determined as defective in this process.

In the subsequent process, as shown in FIG. 4, by lowering the pressing member 45 by driving means installed in the support 41, a load is applied in a state where the pressing member 45 is abutted on the weight portion 51c of the engagement piece 51. At this time, the rod-like body 44 is not fixed to the mounting portion 43 but mounted slidably in the vertical direction, and the entire weights of the rod-like body 44, the pressing member 45, and the weights 46 are applied on the weight portion 51c substantially as they are.

The engagement piece 51 is displaced by the load from the normal position to the fixed position. First, the fixed position is measured by the displacement sensor 14. Specifically, as shown in FIG. 5A, while a load is applied on the weight portion 51c, a distance A between the displacement sensor 14 and the weight portion 51c is measured by the displacement sensor 14. Then, the computer 15 determines if the fixed position is at a predetermined position or not based on whether the measured distance A is equal to a predetermined numerical value or included in a predetermined range of numerical values or not. The numerical value range is a range corresponding to an allowable error of the fixed position. By this arrangement, it is inspected whether the engagement piece 51 of the headrest return prevention mechanism 50 has been displaced to the predetermined fixed position or not.

If the distance A is the predetermined numerical value, it is determined that the engagement piece 51 has been displaced to the predetermined fixed position and the acceptance of the inspection is displayed on the display of the computer 15. If the distance A is not equal to the predetermined numeral value, it is determined that the engagement piece 51 is defective and cannot be displaced to the predetermined fixed position and the rejection of the inspection is displayed on the display of the computer 15.

According to the inspection device 1 of this embodiment, the fixed position is measured by the displacement sensor 14 and it can be inspected whether the engagement piece 51 has been displaced to the predetermined fixed position or not based on the fixed position. Thus, a defective product that is not displaced to the predetermined fixed position can be appropriately determined.

Next, as for those determined as having been displaced to the predetermined fixed position, the pressing member 45 is moved upward by driving the driving means of the support 41, and the load having been applied on the weight portion 51c is released. By this operation, the engagement piece 51 is returned from the fixed position to the normal position into the state shown in FIG. 3 again.

The inspection device 1 of this embodiment measures the normal position of the engagement piece 51 by use of the displacement sensor 14 after the engagement piece 51 is returned to the normal position. Specifically, as shown in FIG. 5B, a distance B between the displacement sensor 14 and the weight portion 51c is measured by the displacement sensor 14. Then, the computer 15 determines whether the normal position after the return is at a predetermined position or not based on whether the measured distance B is equal to a predetermined numerical value or included in a predetermined range of numerical values or not. The numerical value range is a range corresponding to an allowable error of the normal position after return. By this arrangement, it is inspected whether the engagement piece 51 of the headrest return prevention mechanism 50 has returned to the predetermined normal position or not.

If the distance B is the predetermined numerical value, it is determined that the engagement piece 51 has returned to the predetermined normal position and the acceptance of the inspection is displayed on the display of the computer 15. If the distance B is not equal to the predetermined numeral value, it is determined that the engagement piece 51 is defective and cannot be returned to the predetermined normal position, and the rejection of the inspection is displayed on the display of the computer 15.

According to the inspection device 1 of the present invention, the normal position after the return is measured by the displacement sensor 14 and it can be further inspected whether the engagement piece 51 has been returned to the predetermined position or not based on the normal position after the return. Thus, in addition to a defective product that is not displaced to the fixed position, a defective product that is not returned to the predetermined normal position can be appropriately determined.

It is preferable to stamp an acceptance stamp indicating that the inspection has been passed by the printing means 29 on the headrest return prevention mechanism 50 which has returned to the predetermined normal position in this process. In this embodiment, words such as "Passed" indicating that the inspection has been passed are engraved on the tip end face of the printing means 29. And by moving the printing means 29 downward by driving the driving means of the support 41 and pressing the tip end face of the printing means 29 on the upper face of the engagement piece 51, the acceptance mark is printed on the upper face of the engagement piece 51.

The invention claimed is:

1. An inspection device for inspecting a headrest return prevention mechanism, wherein the headrest return prevention mechanism is provided with a fixed portion mountable to a backrest frame and a movable portion mountable to a headrest, wherein the movable portion can return to a normal position after being displaced from the normal position in which the headrest can not be fixed to a fixed position in which the headrest can be fixed while the head of a seated person is supported, comprising:
   a base;
   fixing means for fixing the fixed portion to the base;
   displacing means for applying a load to the movable portion so as to displace the movable portion from the normal position to the fixed position;
   position measuring means for measuring the fixed position when the movable portion is displaced from the normal position to the fixed position; and
   determining means for determining if the movable portion has been displaced to a predetermined fixed position or not on the basis of the fixed position measured by the position measuring means.

2. The inspection device according to claim 1, wherein the position measuring means comprises a displacement sensor that can measure a distance to the movable portion at the fixed position; and
   wherein the determining means determines whether the movable portion has been displaced to the predetermined fixed position or not based on whether a distance between the position measuring means and the movable portion is included in a predetermined range or not.

3. The inspection device according to claim 1, wherein the position measuring means measures the normal position after the movable portion is displaced to the fixed position by the displacing means and returns to the normal position; and
   wherein the determining means further determines whether the movable portion has been returned to the predetermined normal position or not based on the normal position after the return measured by the position measuring means.

4. The inspection device according to claim 1, wherein the displacing means comprises:
   a pressing member for pressing the movable portion; and
   a plurality of weights which can be detachably attached to the pressing member; and
   whereby the displacing means is made capable of increasing/decreasing the load to be applied to the movable portion by increasing/decreasing the number of the weights to be attached to the pressing member.

5. The inspection device according to claim 4, wherein the pressing member is mounted on the lower end portion of a rod-like body and has a predetermined diameter at an upper part; and
   wherein the weight has a hole formed with a diameter smaller than the above diameter and is mounted on the pressing member such that the rod-like body is inserted through the hole.

6. The inspection device according to claim 5, wherein the rod-like body is mounted on a mounting portion having a hole; and
   wherein the upper end portion of the rod-like body is formed in a loop that is wider than the hole of the mounting portion.

7. The inspection device according to claim 1, further comprising a part detection sensor for detecting whether a predetermined part of the headrest return prevention mechanism is at a predetermined position or not.

8. The inspection device according to claim 7, wherein the part detection sensor comprises a color sensor for identifying color of the part.

9. The inspection device according to claim 1, wherein a mounting hole is formed in the fixed portion; and
   wherein a projection is formed at the base at a position corresponding to the mounting hole when the fixed portion is mounted.

10. The inspection device for headrest return prevention mechanism according to claim 9, wherein the fixing means is provided with a holding portion formed at a position corresponding to the projection; and
    wherein a part of the fixed portion is held between the holding portion and the base so as to fix the fixed portion to the base.

11. An inspection device for use in inspecting a headrest return prevention mechanism, wherein the headrest return prevention mechanism has a fixed portion mountable to a backrest frame and a movable portion mountable to a headrest, wherein the movable portion can return to a normal position after being displaced from the normal position to a fixed position, the inspection device comprising:
    a base;
    a fastener, wherein the fastener is arranged to hold the fixed portion to the base;
    a loading applicator, wherein the load applicator is arranged to exert a load on the movable portion so as to displace the movable portion from the normal position to the fixed position;
    a sensor, wherein the sensor is arranged to measure the fixed position when the movable portion is displaced from the normal position to the fixed position; and, a processor, wherein the processor is arranged to determine whether the movable portion has been displaced to a predetermined fixed position or not on the basis of the fixed position measured by the sensor.

12. The inspection device according to claim 11, wherein the sensor comprises a displacement sensor that can measure a distance to the movable portion at the fixed position, and wherein the processor is arranged to determine whether the movable portion has been displaced to the predetermined fixed position or not based on whether a distance between the displacement sensor and the movable portion is within a predetermined range or not.

13. The inspection device according to claim 11, wherein the sensor is arranged to measure the normal position after the movable portion is displaced to the fixed position by the loading applicator and returns to the normal position, and wherein the processor is arranged to further determine whether the movable portion has been returned to the predetermined normal position or not based on the normal position after the return measured by the sensor.

14. The inspection device according to claim 11, wherein the loading applicator comprises:
   a pressing member for pressing the movable portion; and,
   a plurality of weights which can be detachably attached to the pressing member; and
   wherein the loading applicator is thereby made capable of increasing/decreasing the load to be exerted on the movable portion by increasing/decreasing the number of the weights to be attached to the pressing member.

15. The inspection device according to claim 14, wherein the pressing member is mounted on a lower end portion of a rod-like body and has a predetermined diameter at an upper end, and wherein the weight has a hole formed with a diameter smaller than the predetermined diameter and is mounted on the pressing member such that the rod-like body is inserted through the hole.

16. The inspection device according to claim 15, wherein the rod-like body is mounted on a mounting portion having a hole, and wherein the upper end of the rod-like body is formed in a loop that is wider than the hole of the mounting portion.

17. The inspection device according to claim 11, wherein the sensor comprises a first sensor, wherein the inspection device further comprises a second sensor, and wherein the second sensor is arranged to detect whether a predetermined part of the headrest return prevention mechanism is at a predetermined position or not.

18. The inspection device according to claim 17, wherein the second sensor comprises a color sensor, and wherein the color sensor is arranged to identify a color of the predetermined part.

19. The inspection device according to claim 11, wherein a mounting hole is formed in the fixed portion, and wherein a projection is formed at the base at a position corresponding to the mounting hole when the fixed portion is mounted.

20. The inspection device according to claim 19, wherein the loading applicator comprises a holding portion formed at a position corresponding to the projection, and wherein the fixed portion is held between the holding portion and the base so as to fix the fixed portion to the base.

* * * * *